US008744695B2

(12) United States Patent
Kanayama et al.

(10) Patent No.: US 8,744,695 B2
(45) Date of Patent: Jun. 3, 2014

(54) FUEL CONSUMPTION SAVING CONTROL DEVICE FOR WORK VEHICLE AND FUEL CONSUMPTION SAVING METHOD FOR WORK VEHICLE

(75) Inventors: Noboru Kanayama, Kanagawa (JP); Takehiro Komatsu, Komatsu (JP)

(73) Assignee: Komatsu Ltd., Tokyo (JP)

( * ) Notice: Subject to any disclaimer, the term of this patent is extended or adjusted under 35 U.S.C. 154(b) by 7 days.

(21) Appl. No.: 13/257,397

(22) PCT Filed: Mar. 11, 2010

(86) PCT No.: PCT/JP2010/054153
§ 371 (c)(1),
(2), (4) Date: Sep. 19, 2011

(87) PCT Pub. No.: WO2010/110086
PCT Pub. Date: Sep. 30, 2010

(65) Prior Publication Data
US 2012/0010790 A1    Jan. 12, 2012

(30) Foreign Application Priority Data

Mar. 27, 2009 (JP) .................................. 2009-080187

(51) Int. Cl.
G06F 19/00 (2011.01)
(52) U.S. Cl.
USPC ........................................................ 701/50
(58) Field of Classification Search
USPC ............. 701/50, 51, 53, 54, 58, 95; 180/165, 180/175, 56.4, 53.6, 53.7, 53.8, 338; 700/28
See application file for complete search history.

(56) References Cited

U.S. PATENT DOCUMENTS

| 5,323,688 | A | * | 6/1994 | Walker | ............................ 91/491 |
| 5,495,912 | A | * | 3/1996 | Gray et al. | .................... 180/165 |
| 5,592,817 | A | | 1/1997 | Nishimura et al. | |
| 6,582,340 | B1 | * | 6/2003 | Arie et al. | ........................ 477/97 |
| 6,705,030 | B2 | * | 3/2004 | Tokunaga | ........................ 37/348 |
| 6,719,080 | B1 | * | 4/2004 | Gray, Jr. | ......................... 180/165 |

(Continued)

FOREIGN PATENT DOCUMENTS

| JP | 05-042843 A | 2/1993 |
| JP | 06-305339 A | 11/1994 |
| JP | 2002-315105 A | 10/2002 |
| JP | 2004-011469 A | 1/2004 |

OTHER PUBLICATIONS

International Search Report dated May 11, 2010, issued for PCT/JP2010/054153.

Primary Examiner — Khoi Tran
Assistant Examiner — Adam Mott
(74) Attorney, Agent, or Firm — Edwards Wildman Palmer LLP

(57) ABSTRACT

A fuel consumption saving control device for a work vehicle includes: a vehicle speed detector 11 for detecting whether the vehicle is traveling; an accelerator operation detector 16 for detecting whether an accelerator operating member is not operated; a boom operating lever 23 for detecting whether a command to carry out operation to lift a boom which performs cargo carrying work has been issued; and a controller 8 for carrying out control for increasing a speed reducing ratio of a travel transmission 4 when the vehicle speed detector 11 detects that the vehicle is traveling, the accelerator operation detector 16 detects that the accelerator operating member is not operated, and also the boom operating lever 23 detects that the command to lift the boom has been issued.

4 Claims, 8 Drawing Sheets

(56) References Cited

U.S. PATENT DOCUMENTS

| | | | |
|---|---|---|---|
| 2004/0188168 A1* | 9/2004 | Aumann | 180/336 |
| 2006/0004509 A1* | 1/2006 | Teslak et al. | 701/84 |
| 2007/0182245 A1* | 8/2007 | DuCharme | 303/152 |
| 2007/0225882 A1* | 9/2007 | Yamaguchi et al. | 701/36 |
| 2008/0129109 A1* | 6/2008 | Schuh et al. | 303/9.61 |
| 2008/0174172 A1* | 7/2008 | Cannata | 303/10 |
| 2009/0036248 A1* | 2/2009 | Mueller et al. | 475/72 |
| 2009/0236906 A1* | 9/2009 | Walker | 303/152 |
| 2010/0131158 A1* | 5/2010 | Saito | 701/50 |
| 2010/0241322 A1* | 9/2010 | Miyanoo | 701/54 |
| 2011/0004365 A1* | 1/2011 | Rutquist et al. | 701/22 |

* cited by examiner

FUEL CONSUMPTION SAVING CONTROL DEVICE FOR WORK VEHICLE AND FUEL CONSUMPTION SAVING METHOD FOR WORK VEHICLE

FIELD

The present invention relates to a fuel consumption saving control device for a work vehicle and a fuel consumption saving control method for the work vehicle which can save fuel consumption of the work vehicle such as a wheel loader and a forklift for cargo carrying work.

BACKGROUND

As an example of conventional typical work for which a wheel loader is used frequently, V-shape loading will be described. The V-shape loading refers to repetition of loading by moving between a mountain of dirt or gravel and a dump truck while making a V-shaped trail. In this case, the wheel loader repeats forward and backward travel and repeats excavation and discharge and therefore fuel consumption increases in acceleration. Not only that, overheating of a brake due to increase in a load on the brake in deceleration as well as high maintenance cost due to wear of the brake are problems.

Therefore, in Patent Literature 1, an electric motor capable of transmitting torque to driving wheels and an electricity storage means for receiving and transferring electric energy from and to the electric motor are provided and a controller controls electricity generation actuation of the electric motor for receiving torque transmission from the driving wheels and generating electricity during decelerating operation of a vehicle and stores the generated electric energy in the electricity storage means. In other words, the electric motor carries out regenerative braking during the decelerating operation of the vehicle, converts kinetic energy of the vehicle into electric energy, and stores the electric energy. Therefore, it is possible to reduce frequency of use of the brake for the purpose of deceleration to thereby not only suppress the overheating of the brake but also reduce the maintenance cost due to the wear of the brake. Moreover, assist operation for receiving the electric energy stored in the electricity storage means and transmitting the torque to the driving wheels is carried out during accelerating operation of the vehicle and therefore it is possible not only to increase accelerating performance of the vehicle but also to reduce fuel consumption by suppressing output of the engine.

CITATION LIST

Patent Literature

Patent Literature 1: Japanese Patent Application Laid-Open No. 2002-315105

SUMMARY

Technical Problem

However, the device in the above-described Patent Literature 1 temporarily converts the kinetic energy of the vehicle to the electric energy to take out the electric energy and therefore losses are caused by the energy conversion. To put it concretely, the loss is caused by the conversion of the kinetic energy from the vehicle to the electric energy, the loss is caused by storing the converted electric energy in the electricity storage means, the loss is caused by taking the electric energy out of the electricity storage means, and the loss is caused by converting the taken-out electric energy to the kinetic energy. In other words, efficiency of regeneration and reclamation of energy is low, which, as a result, impairs the fuel consumption saving effect. Moreover, the electric motor for converting the kinetic energy of the vehicle to the electric energy and for reversely converting the electric energy to the kinetic energy, the electricity storage device for storing the electric energy, and the control device for controlling both the devices are extremely expensive.

The present invention has been made with the above circumstances in view and its object is to provide a fuel consumption saving control device for a work vehicle and a fuel consumption saving control method for the work vehicle which can improve efficiency of regeneration and reclamation of energy to further facilitate saving of fuel consumption and which can also be made up of a simple structure.

Solution to Problem

According to an aspect of the present invention, a fuel consumption saving control device for a work vehicle includes: a travel detecting portion for detecting whether the vehicle is traveling; an accelerator operation detecting portion for detecting whether an accelerator operating member is not operated; a work operation detecting portion for detecting whether a command to carry out operation to lift a work machine which performs cargo carrying work has been issued; and a control portion for carrying out control for increasing a speed reducing ratio of a travel transmission and/or control for increasing a capacity of a hydraulic pump used for the work machine when the travel detecting portion detects that the vehicle is traveling, the accelerator operation detecting portion detects that the accelerator operating member is not operated, and the work operation detecting portion detects that the command to lift the work machine has been issued.

Advantageously, in the fuel consumption saving control device for a work vehicle, the work operation detecting portion detects a lifting operation command amount of the work machine, and the control portion changes the speed reducing ratio of the travel transmission and/or the capacity of the hydraulic pump used for the work machine according to the lifting operation command amount of the work machine.

Advantageously, the fuel consumption saving control device for a work vehicle further includes a setting switch for setting whether to carry out the control for increasing the speed reducing ratio of the travel transmission and/or the control for increasing the capacity of the hydraulic pump used for the work machine by the control portion. The control portion carries out the control for increasing the speed reducing ratio of the travel transmission and/or control for increasing the capacity of the hydraulic pump used for the work machine when the setting has been carried out by the setting switch.

According to another aspect of the present invention, a fuel consumption saving control method for a work vehicle includes: detecting whether a vehicle is traveling, whether an accelerator operating member is not operated, and whether a command to carry out operation to lift a work machine which performs cargo carrying work has been issued; and controlling by carrying out control for increasing a speed reducing ratio of a travel transmission and/or control for increasing a capacity of a hydraulic pump used for the work machine when it is detected that the vehicle is traveling, it is detected that the accelerator operating member is not operated, and also it is detected that the command to carry out the operation to lift the work machine has been issued.

Advantageously, in the fuel consumption saving control method for a work vehicle, the detecting includes detection of a lifting operation command amount of the work machine, and the control includes changing of the speed reducing ratio of the travel transmission and/or the capacity of the hydraulic pump used for the work machine based on the lifting operation command amount of the work machine.

Advantageously, the fuel consumption saving control method for a work vehicle, further includes setting detecting of detecting setting of whether to carry out the control for increasing the speed reducing ratio of the travel transmission and/or the control for increasing the capacity of the hydraulic pump used for the work machine in the control step. The control step carries out the control for increasing the speed reducing ratio of the travel transmission and/or the control for increasing the capacity of the hydraulic pump used for the work machine when the setting is detected in the setting detecting step.

Advantageous Effects of Invention

According to the invention, the control portion carries out the control for increasing the speed reducing ratio of the travel transmission and/or the control for increasing the capacity of the hydraulic pump used for the work machine when the travel detecting portion detects that the vehicle is traveling, the accelerator operation detecting portion detects that the accelerator operating member is not operated, and also the work operation detecting portion detects that the command to lift the work machine has been issued. In this way, the kinetic energy of the vehicle body is converted to absorption energy of the hydraulic pump of the work machine as it is to assist the lifting operation of the work machine and therefore it is possible to improve efficiency of regeneration and reclamation of energy to further facilitate saving of fuel consumption.

DESCRIPTION OF EMBODIMENTS

A fuel consumption saving control device for a work vehicle and a fuel consumption saving control method for the work vehicle which are embodiments for carrying out the present invention will be described with reference to the drawings. In the embodiments, a wheel loader will be described as an example of the work vehicle to which the fuel consumption saving control device for the work vehicle and the fuel consumption saving control method for the work vehicle are applied. The work vehicle may be any vehicle which performs lifting operation of a work machine and the device and the method can be applied to a forklift, for example.

Embodiment 1

Figure 1:
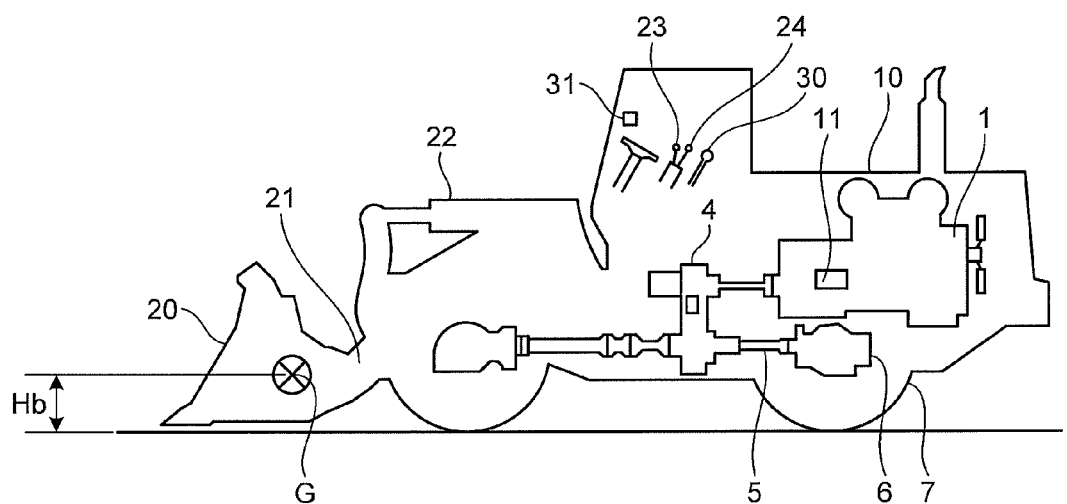
FIG. 1 is a schematic diagram illustrating a general structure of a wheel loader to which a fuel consumption saving control device for a work vehicle according to an embodiment 1 of the present invention is applied.
Figure 2:
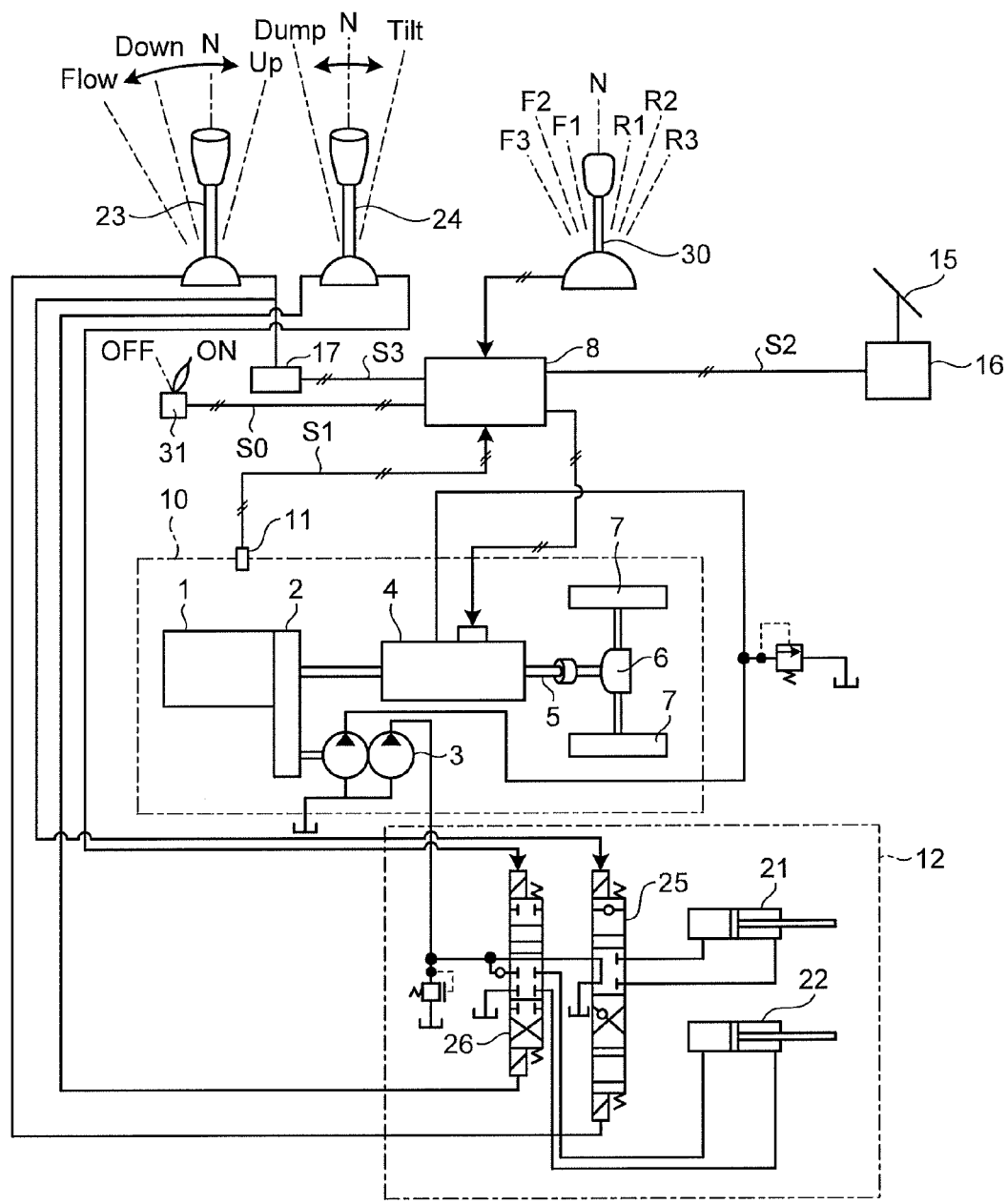
FIG. 2 is a block diagram including the structure of the fuel consumption saving control device for the work vehicle applied to the wheel loader illustrated in FIG. 1.

FIG. 1 is a schematic diagram illustrating a general structure of a wheel loader to which a fuel consumption saving control device for a work vehicle according to an embodiment 1 of the present invention is applied. FIG. 2 is a block diagram including the structure of the fuel consumption saving control device for the work vehicle applied to the wheel loader illustrated in FIG. 1. In FIGS. 1 and 2, an engine 1 is mounted to a rear portion of a vehicle body 10 in the wheel loader and is connected to a travel transmission 4 and a fixed capacity hydraulic pump 3 via a PTO 2 for taking torque of the engine 1 outside.

The travel transmission 4 is a continuously variable transmission and is made up of an HST (Hydro-Static Transmission), a belt-type continuously variable transmission, or the like. The travel transmission 4 receives a command from a controller 8 and decelerates and accelerates a rotary shaft. An output side of the travel transmission 4 is connected to a drive shaft 5 to transmit power to tires 7 via a differential gear 6. A vehicle speed detector 11 is provided in the vehicle body 10 and detected vehicle speed S1 is output to the controller 8. The continuously variable transmission may be a power converter in which a hydraulic pump and a hydraulic motor are formed as a closed circuit, the hydraulic pump is connected to the PTO 2 side, and the hydraulic motor is connected to the drive shaft 5 side. In this case, a flow rate of oil in the closed circuit is changed by controlling inclination of (a) swash plate(s) of the hydraulic pump and/or the hydraulic motor to thereby convert the vehicle speed.

On the other hand, the hydraulic pump 3 supplies the oil to an oil hydraulic circuit 12 and drives a boom cylinder 21 and a bucket cylinder 22 through control valves 25 and 26, respectively. Pilot pressures from a boom operating lever 23 and a bucket operating lever 24 are respectively supplied to the control valves 25 and 26, and the respective pilot pressures control driving of the boom cylinder 21 and the bucket cylinder 22, respectively.

The boom operating lever 23 can be switched between four positions: Up (lifting), N (neutral), Down (lowering), and Flow (flowing). The bucket operating lever 24 can be switched between three positions: Tilt (excavation), N (neutral), and Dump (dumping). By switching the positions of the boom operating lever 23 and the bucket operating lever 24, the boom cylinder 21 and the bucket cylinder 22 are driven to carry out the Up (lifting), N (neutral), Down (lowering), and Flow (flowing) operations of a boom and the Tilt (excavation), N (neutral), and Dump (dumping) operations of a bucket 20. Here, if the boom operating lever 23 is operated into the Up (lifting) position, an operated amount S3 of the Up (lifting) is output from the boom operating lever 23 to the controller 8 via a pressure sensor 17. The pressure sensor 17 converts pilot pressure proportional to the lever operated amount to an electric signal and outputs the signal.

A gear shifting lever 30 can be switched between seven positions: F1 (forward first speed), F2 (forward second speed), F3 (forward third speed), N (neutral), R1 (reverse first speed), R2 (reverse second speed), and R3 (reverse third speed) and transmits power to the tires 7 via the controller 8 and the vehicle speed converter 4.

An accelerator operating member 15 outputs an accelerator opening degree S2 which is an operated amount of the accelerator operating member 15 to the controller 8 via an accelerator operation detector 16 and the controller 8 controls a governor (not illustrated) to control an engine speed of the engine 1 based on the accelerator opening degree S2.

A fuel consumption saving setting switch 31 is a switch for setting whether to carry out the fuel consumption saving control. If the control is set, a fuel consumption saving setting signal S0 indicating ON is output to the controller 8.

Figure 3:
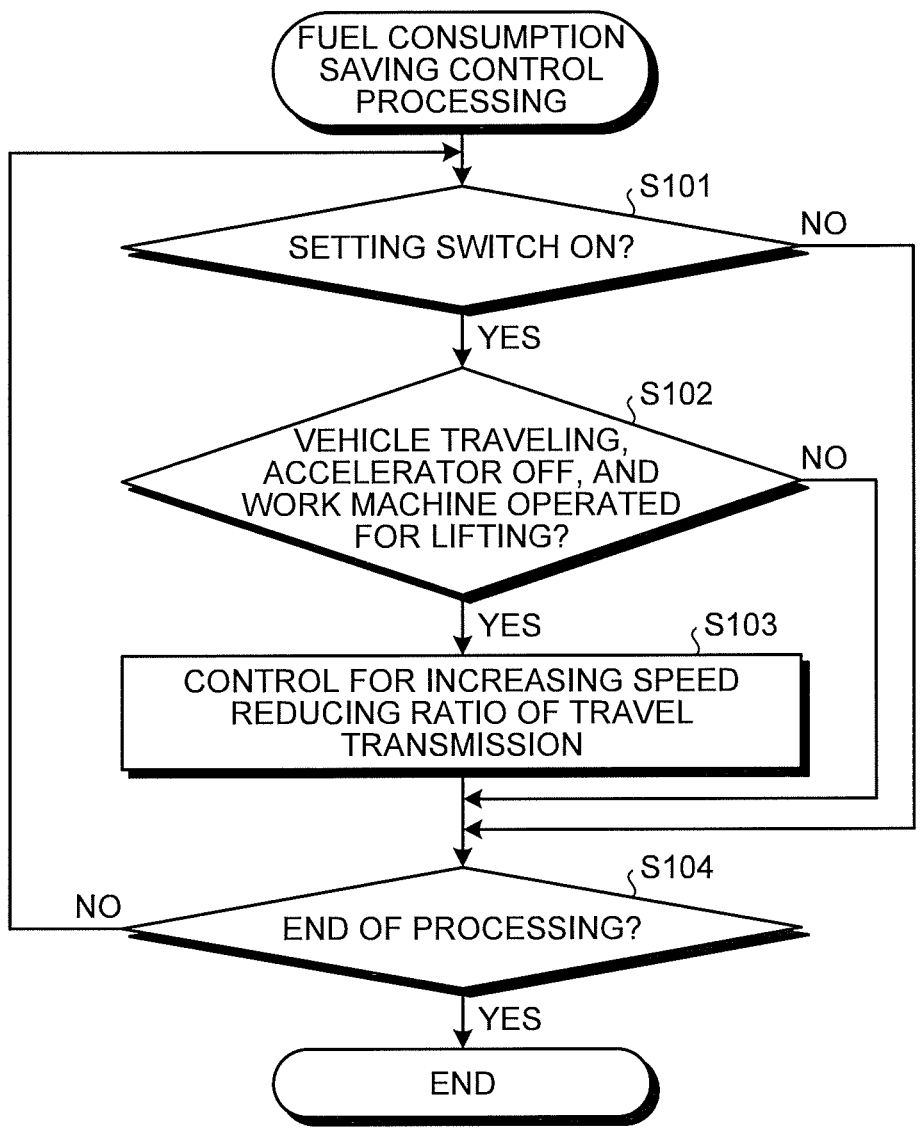
FIG. 3 is a flowchart illustrating a procedure of fuel consumption saving control processing of a controller according to the embodiment 1 of the invention.

Here, with reference to a flowchart illustrated in FIG. 3, fuel consumption saving control processing by the controller 8 will be described. In FIG. 3, first, the controller 8 determines whether or not the fuel consumption saving setting switch 31 is in an ON state (step S101). If the fuel consumption saving setting switch 31 is not in the ON state (No in step S101), the processing goes to step S104. Unless the processing by the controller 8 ends, the determination processing in step S101 is carried out. Here, if the fuel consumption saving setting switch 31 is not in the ON state, i.e., if it is in an OFF state, the controller 8 carries out normal travel control and work machine control by parallel processing (not illustrated).

On the other hand, if the fuel consumption saving setting switch 31 is in the ON state (Yes in step S101), whether the vehicle is traveling is determined based on the vehicle speed S1, whether the accelerator operating member 15 is not operated (hereafter referred to as "accelerator OFF") based on the accelerator opening degree S2, whether the boom Up (lifting) operation has been carried out is determined based on the operated amount S3 of the work machine, i.e., the boom Up (lifting), and finally, whether all of the conditions that the vehicle is traveling, that the accelerator is in the off state, and that the boom Up (lifting) operation has been carried out are satisfied is determined (step S102).

If all of the conditions that the vehicle is traveling, that the accelerator is in the off state, and that the boom Up (lifting) operation has been carried out (Yes in step S102) are satisfied, the controller 8 controls the travel transmission 4 to increase a speed reducing ratio over that under normal travel control (step S103). In this case, it is preferable that the change in the speed reducing ratio in this case corresponds to the operated amount S3. Then, the processing goes to step S104 and goes to step S101 unless the processing by the controller 8 does not end. On the other hand, if not all of the conditions that the vehicle is traveling, that the accelerator is in the off state, and that the boom Up (lifting) operation has not been carried out are satisfied (No in step S102), the processing goes to step S104 and goes to step S101 unless the processing by the controller 8 ends (Yes in Step S104).

Figure 4:
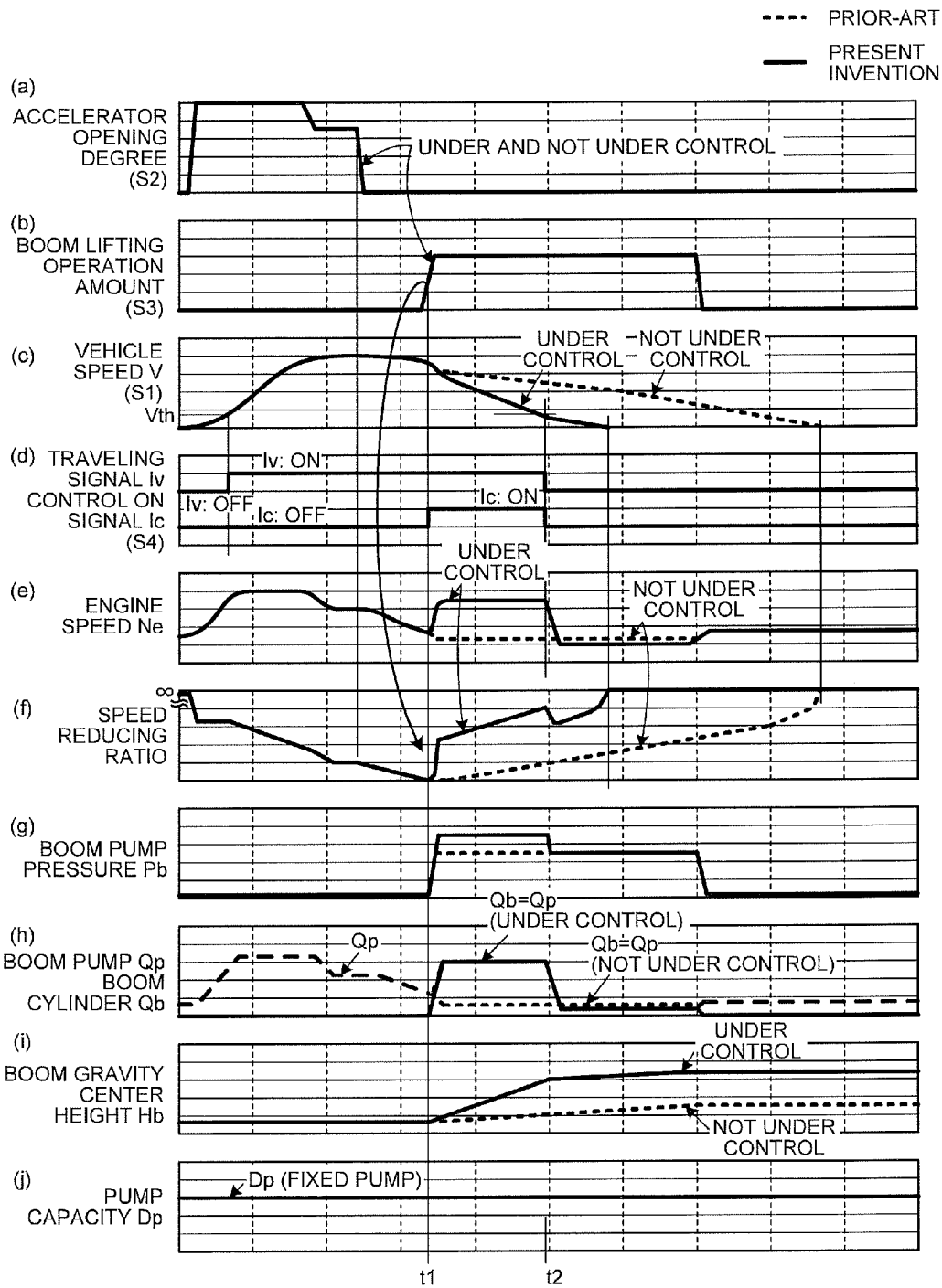
FIGS. 4(a) to 4(j) are timing diagrams illustrating the fuel consumption saving control processing according to the embodiment 1 of the invention.

Here, with reference to timing diagrams illustrated in FIGS. 4(*a*) to 4(*j*), operations of the respective portions in carrying out the fuel consumption saving control processing will be described. In FIGS. 4(*a*) to 4(*j*), broken lines represent the conventional art control processing in which the fuel consumption saving control processing according to the embodiment 1 is not carried out and solid lines represent the fuel consumption saving control processing in the embodiment 1. In FIGS. 4(*a*) to 4(*j*), before time t1, the accelerator is in the OFF state (see FIG. 4(*a*)) and the vehicle is traveling at a vehicle speed V (S1) not lower than a certain value Vth (see FIG. 4(*c*)), while the boom Up (lifting) operated amount S3 is zero (see FIG. 4(*b*)). Therefore, the controller 8 does not carry out the fuel consumption saving control processing. Here, if the vehicle speed is not lower than the certain value Vth, the traveling signal Iv in FIG. 4(*d*) is turned ON to indicate that the vehicle is traveling.

At the time t1, if the boom Up (lifting) operated amount S3 exceeds zero, it satisfies all of the conditions that the vehicle is traveling, that the accelerator is in the OFF state, and that the boom Up (lifting) operation has been carried out and therefore a control signal Ic of the controller 8 is in an ON state while the conditions are satisfied (from time t1 to time t2) (see FIG. 4(*d*)). While the control signal Ic is in the ON state, the controller 8 controls the travel transmission 4 to increase the speed reducing ratio (see FIG. 4(*f*)). Then, the engine speed Ne increases accordingly (see FIG. 4(*e*)), pump pressure Pb increases (see FIG. 4(*g*)), and a flow rate Qb of the boom cylinder 21 increases (see FIG. 4(*h*)). As a result, driving of a boom cylinder 21 is assisted, and height (boom gravity center height) Hb of the boom gravity center G illustrated in FIG. 1 increases as compared with that under the normal control so that the Up (lifting) operation is sped up (see FIG. 4(*i*)). The hydraulic pump 3 is of the fixed capacity type and therefore a capacity of the hydraulic pump 3 does not change when the fuel consumption saving control is carried out (see FIG. 4(*j*)).

In the embodiment 1, if all of the conditions that the vehicle is traveling, that the accelerator is in the OFF state, and that the boom Up (lifting) operation has been carried out are satisfied, the speed reducing ratio of the travel transmission 4 is increased over the normal ratio to increase the speed of the engine 1. In this way, the kinetic energy of the vehicle body is converted to absorption energy of the hydraulic pump 3 of the work machine as it is to assist the boom Up (lifting) operation and therefore it is possible to regenerate the kinetic energy of the vehicle body to obtain hydraulic energy for the boom Up (lifting) and also potential energy of the boom. As a result, a structure such as an electricity storage means becomes unnecessary and it is possible to further facilitate saving of the fuel consumption during the work with the simple structure.

Embodiment 2

Next, an embodiment 2 of the invention will be described. Although the hydraulic pump 3 is of a fixed capacity type in the above-described embodiment 1, a variable displacement hydraulic pump 33 is used as a hydraulic pump for a work machine in the embodiment 2.

Figure 5:
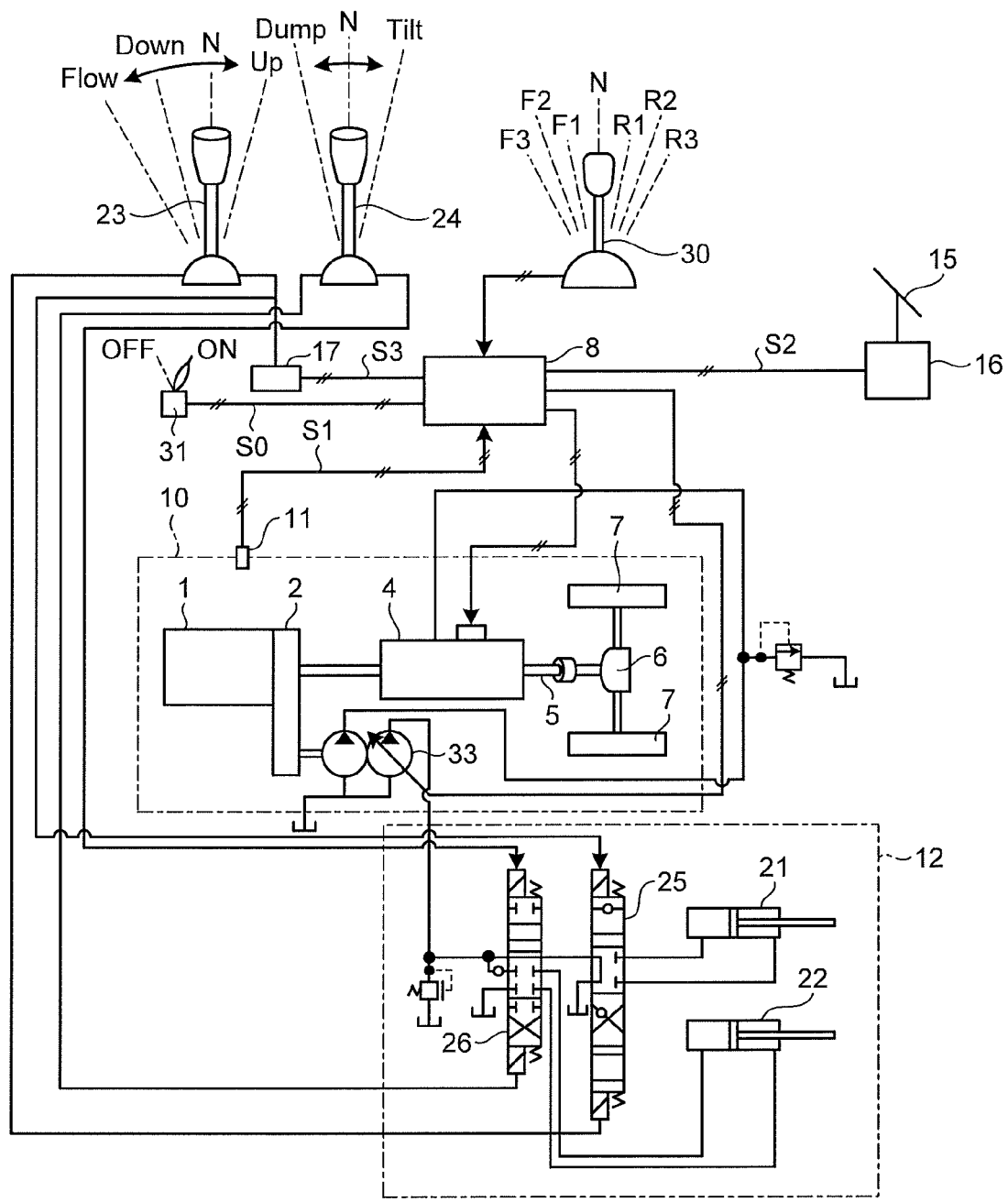
FIG. 5 is a block diagram including a structure of a fuel consumption saving control device for a work vehicle according to an embodiment 2 of the invention.

In other words, as illustrated in FIG. 5, the variable displacement hydraulic pump 33 is provided in place of the fixed displacement hydraulic pump 3. In the hydraulic pump 33, a controller 8 controls an inclination of a swash plate of the hydraulic pump 33 to thereby change a capacity of the hydraulic pump 33. The controller 8 carries out control for increasing a speed reducing ratio of the travel transmission 4 over a normal ratio similarly to the embodiment 1 and also carries out control for increasing the capacity of the hydraulic pump 33 when all of the conditions that the vehicle is traveling, that the accelerator is in the OFF state, that and the boom Up (lifting) operation has been carried out are satisfied. In this case, it is preferable to change the capacity of the hydraulic pump 33 according to an operated amount S3. Here, both or only one of the control for increasing the speed reducing ratio of the travel transmission 4 over the normal ratio and the control for increasing the capacity of the hydraulic pump 33 may be carried out. Other structures are similar to those in the embodiment 1.

Figure 6:
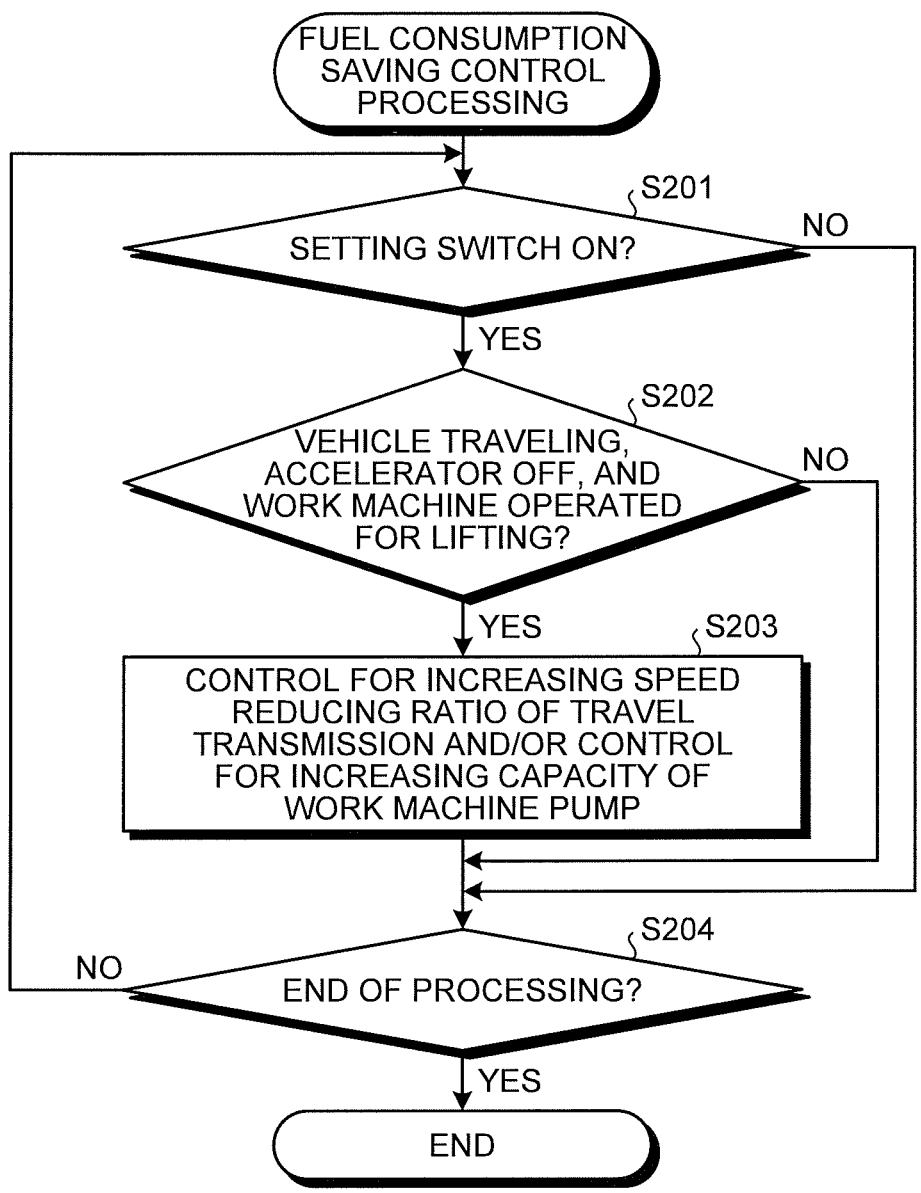
FIG. 6 is a flow chart illustrating a procedure of fuel consumption saving control processing of a controller according to the embodiment 2 of the invention.

FIG. 6 is a flowchart illustrating a procedure of fuel consumption saving control processing by the fuel consumption saving control device for the work machine according to the embodiment 2 of the invention. This flowchart is different from the flowchart illustrated in FIG. 3 in that, in place of step S103, the control for increasing the reducer of the travel transmission and/or the control for increasing the capacity of the hydraulic pump for the work machine are/is carried out (step S203).

Figure 7:
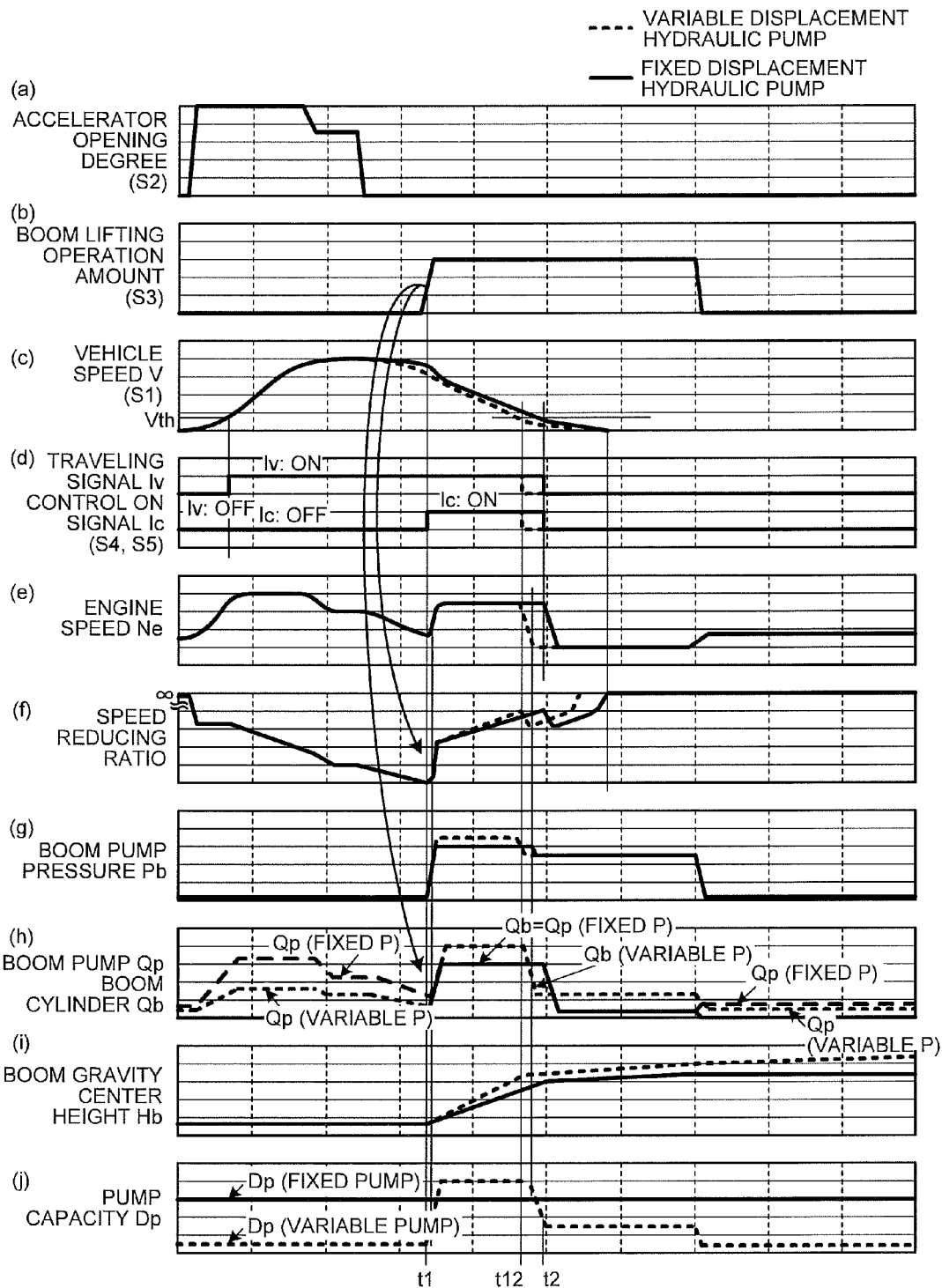
FIGS. 7(a) to 7(j) are timing diagrams illustrating the fuel consumption saving control processing according to the embodiment 2 of the invention.

Here, with reference to timing diagrams illustrated in FIGS. 7(a) to 7(j), operations of the respective portions in carrying out the fuel consumption saving control processing will be described. In FIGS. 7(a) to 7(j), broken lines represent the fuel consumption saving control processing using the variable displacement hydraulic pump 33 according to the embodiment 2 and solid lines represent the fuel consumption saving control processing using the fixed displacement hydraulic pump 3 according to the embodiment 1. In FIGS. 7(a) to 7(j), before time t1, the accelerator is in the OFF state (see FIG. 7(a)) and the vehicle is traveling at a vehicle speed V (S1) not lower than a certain value Vth (see FIG. 7(c)), while the boom Up (lifting) operated amount S3 is zero (see FIG. 7(b)). Therefore, the controller 8 does not carry out the fuel consumption saving control processing. Here, if the vehicle speed is not lower than the certain value Vth, the traveling signal Iv in FIG. 7(d) is turned ON to indicate that the vehicle is traveling.

At the time t1, if the boom Up (lifting) operated amount S3 exceeds zero, it satisfies all of conditions that the vehicle is traveling, that the accelerator is in the OFF state, and that the boom Up (lifting) operation has been carried out and therefore a control signal Ic of the controller 8 is in an On state while the conditions are satisfied (from time t1 to time t12) see FIG. 7(d)). While the control signal Ic is in the ON state, the controller 8 controls the travel transmission 4 to increase the speed reducing ratio (see FIG. 7(f)) and carries out control for increasing a swash plate angle of the hydraulic pump 33 and increasing a flow rate Qb of a boom cylinder 21 (see FIG. 7h)). Then, the engine speed Ne increases accordingly (see FIG. 7(e)) and pump pressure Pb increases (see FIG. 7(g)). As a result, driving of the boom cylinder 21 is assisted, and the boom gravity center height Hb illustrated in FIG. 1 increases as compared with that under the normal control so that the Up (lifting) operation is sped up (see FIG. 7(i)).

Especially because the control for increasing the capacity of the hydraulic pump 33 is carried out in the embodiment 2, it is possible to produce a larger pump capacity in a shorter time to further increase performance of speeding up the Up (lifting) operation as compared with only controlling the travel transmission 4 to increase the speed reducing ratio. A fuel consumption saving control processing period t1 to t12 becomes shorter than a fuel consumption saving control processing period t1 to t2 in the embodiment 1. Because the hydraulic pump 3 is of the variable displacement type, the pump capacity Dp is larger for the fuel consumption saving control processing period t1 to t12 (see FIG. 7(j)).

In the embodiment 2, the hydraulic pump 33 for the work machine is of the variable displacement type and the controller 8 carries out the control for increasing the speed reducing ratio of the travel transmission 4 and directly changes the capacity of the hydraulic pump 33. Therefore, it is possible to further improve energy conversion efficiency to further facilitate saving of the fuel consumption.

Embodiment 3

Next, an embodiment 3 of the invention will be described. Although the travel transmission 4 is the continuously variable transmission in the above-described embodiments 1 and 2, the travel transmission 4 is a stepped transmission in the embodiment 3. Other structures are similar to those in the embodiment 1.

Figure 8:
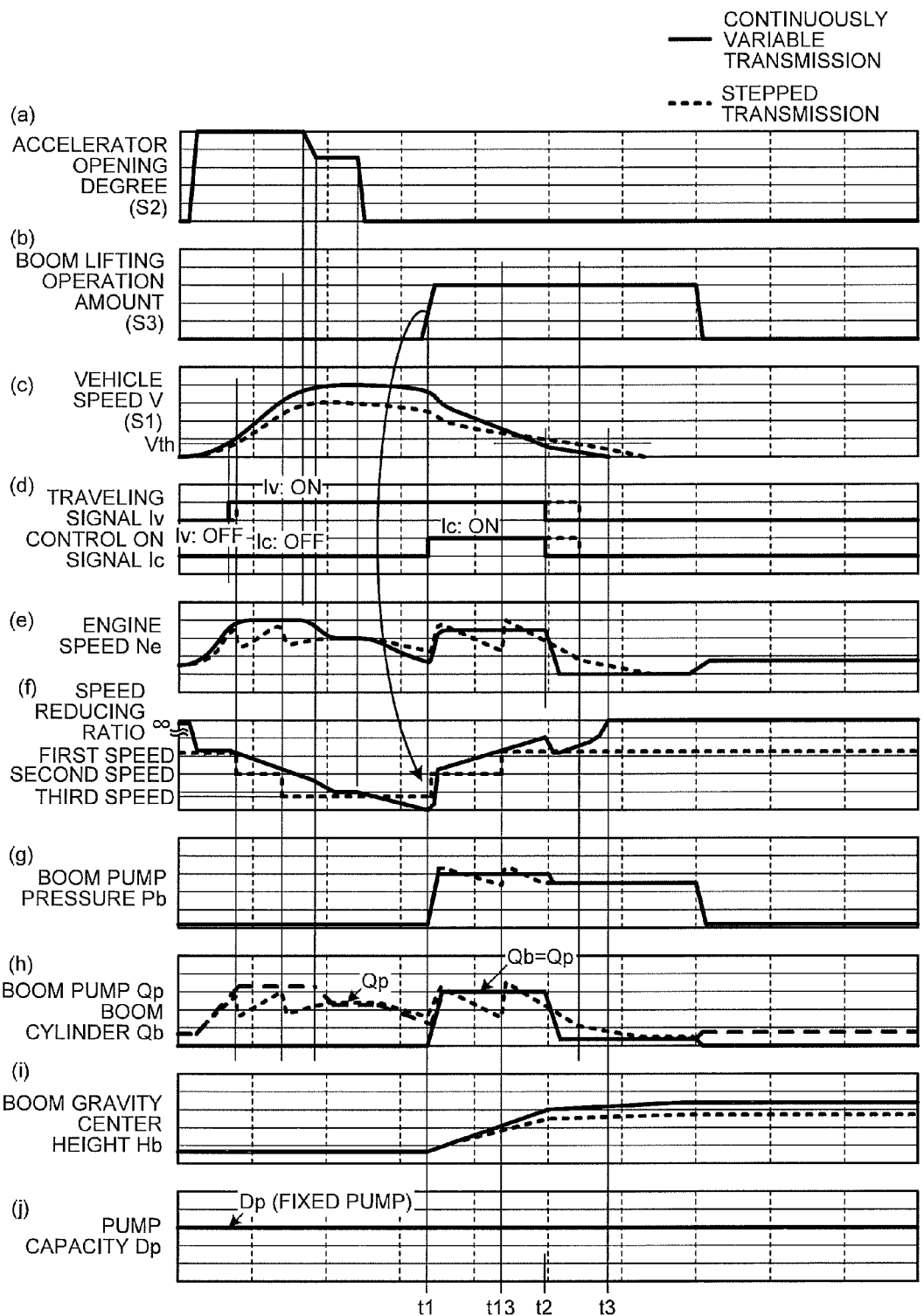
FIGS. 8(a) to 8(j) are timing diagrams illustrating fuel consumption saving control processing according to an embodiment 3 of the invention.

Here, with reference to timing diagrams illustrated in FIGS. 8(a) to 8(j), operations of the respective portions in carrying out the fuel consumption saving control processing according to the embodiment 3 of the invention will be described. In FIGS. 8(a) to 8(j), broken lines represent the fuel consumption saving control processing with the stepped transmission according to the embodiment 3 and solid lines represent the fuel consumption saving control processing with the continuously variable transmission according to the embodiment 1. In FIGS. 8(a) to 8(j), before time t1, the accelerator is in the OFF state (see FIG. 8(a)) and the vehicle is traveling at a vehicle speed V (S1) not lower than a certain value Vth (see FIG. 8(c)), while the boom Up (lifting) operated amount S3 is zero (see FIG. 8(b)). Therefore, the controller 8 does not carry out the fuel consumption saving control processing. Here, if the vehicle speed is not lower than the certain value Vth, the traveling signal Iv in FIG. 8(d) is turned ON to indicate that the vehicle is traveling.

At the time t1, if the boom Up (lifting) operated amount S3 exceeds zero, it satisfies all of the conditions that the vehicle is traveling, that the accelerator is in the OFF state, and that the boom Up (lifting) operation has been carried out and therefore a control signal Ic of the controller 8 is in an ON state while the conditions are satisfied (from time t1 to time t3) (see FIG. 8(d)). While the control signal Ic is in the ON state, the controller 8 controls the travel transmission 4 to increase the speed reducing ratio in stages (see FIG. 8(f)). In other words, the control is carried out to increase the speed reducing ratio from the third speed to the second speed immediately after the time t1 and then to further increase the speed reducing ratio from the second speed to the first speed immediately after time t13 (see FIG. 8(f)). Then, the engine speed Ne increases accordingly (see FIG. 8(e)), pump pressure Pb increases (see FIG. 8(g)), and a flow rate Qb of a boom cylinder 21 increases (see FIG. 8(h)). As a result, driving of the boom cylinder 21 is assisted, and the boom gravity center height Hb illustrated in FIG. 1 increases as compared with that under the normal control so that the Up (lifting) operation is sped up (see FIG. 8(i)). The hydraulic pump 3 is of the fixed capacity type and therefore a capacity of the hydraulic pump 3 does not change when the fuel consumption saving control processing is carried out (see FIG. 8(j)).

In the embodiment 3, even if the travel transmission 4 is the stepped transmission, when all of the conditions that the vehicle is traveling, that the accelerator is in the OFF state, and that the boom Up (lifting) operation has been carried out are satisfied, the speed reducing ratio of the travel transmission 4 is increased over the normal ratio to increase the speed of the engine 1. In this way, the kinetic energy of the vehicle body is converted to absorption energy of the hydraulic pump 3 of the work machine as it is to assist the boom Up (lifting) operation and therefore it is possible to considerably improve energy efficiency. As a result, a structure such as an electricity storage means becomes unnecessary and it is possible to further facilitate saving of the fuel consumption during the work with the simple structure.

The travel transmission 4 may be a combination of the continuously variable transmission and the stepped transmission. In this case, stepped transmission may be used as well when a large speed reducing ratio is required.

INDUSTRIAL APPLICABILITY

As described above, the fuel consumption saving control device for the work vehicle and the fuel consumption saving control method for the work vehicle according to the invention are useful in construction machines and are especially suitable for saving of the fuel consumption of the work vehicle such as a wheel loader and a forklift for cargo carrying work.

REFERENCE SIGNS LIST 1 engine
2 PTO
3, 33 hydraulic pump
4 travel transmission
5 drive shaft
6 differential gear
7 tire
8 controller
10 vehicle body
11 vehicle speed detector
12 oil hydraulic circuit
15 accelerator operating member
16 accelerator operation detector
17 pressure sensor
20 bucket
21 boom cylinder
22 bucket cylinder
23 boom operating lever
24 bucket operating lever
25, 26 control valve
30 gear shifting lever
31 fuel consumption saving setting switch

The invention claimed is:

1. A fuel consumption saving control device for a work vehicle comprising:
a travel detecting portion for detecting whether the vehicle is traveling;
an accelerator operation detecting portion for detecting whether an accelerator operating member is not operated;
a work operation detecting portion for detecting whether a command to carry out operation to lift a work machine which performs cargo carrying work has been issued; and
a control portion for carrying out control for increasing a speed reducing ratio of a travel transmission and control for increasing a capacity of a hydraulic pump used for the work machine when the travel detecting portion detects that the vehicle is traveling, the accelerator operation detecting portion detects that the accelerator operating member is not operated, and the work operation detecting portion detects that the command to lift the work machine has been issued, wherein
the control portion changes the speed reducing ratio of the travel transmission and the capacity of the hydraulic pump used for the work machine according to the lifting operation command amount of the work machine.

2. The fuel consumption saving control device for a work vehicle according to claim 1, further comprising
a setting switch for setting whether to carry out the control for increasing the speed reducing ratio of the travel transmission and the control for increasing the capacity of the hydraulic pump used for the work machine by the control portion, wherein
the control portion carries out the control for increasing the speed reducing ratio of the travel transmission and control for increasing the capacity of the hydraulic pump used for the work machine when the setting has been carried out by the setting switch.

3. A fuel consumption saving control method for a work vehicle comprising:
detecting whether a vehicle is traveling, whether an accelerator operating member is not operated, and whether a command to carry out operation to lift a work machine which performs cargo carrying work has been issued; and
controlling by carrying out control for increasing a speed reducing ratio of a travel transmission and control for increasing a capacity of a hydraulic pump used for the work machine when it is detected that the vehicle is traveling, it is detected that the accelerator operating member is not operated, and also it is detected that the command to carry out the operation to lift the work machine has been issued, wherein
the detecting includes detection of a lifting operation command amount of the work machine, and
the control includes changing of the speed reducing ratio of the travel transmission and the capacity of the hydraulic pump used for the work machine based on the lifting operation command amount of the work machine.

4. The fuel consumption saving control method for a work vehicle according to claim 3, further comprising a setting detecting of detecting setting of whether to carry out the control for increasing the speed reducing ratio of the travel transmission and the control for increasing the capacity of the hydraulic pump used for the work machine in the control step, wherein
the control step carries out the control for increasing the speed reducing ratio of the travel transmission and the control for increasing the capacity of the hydraulic pump used for the work machine when the setting is detected in the setting detecting step.

* * * * *